United States Patent
Menke et al.

(10) Patent No.: US 9,480,943 B2
(45) Date of Patent: Nov. 1, 2016

(54) FILTER DEVICE AND FILTER SYSTEM

(71) Applicant: Dr. Ing. h.c.F. Porsche Aktiengesellschaft, Stuttgart (DE)

(72) Inventors: Andreas Menke, Vaihingen an der Enz (DE); Ulrich Essig, Wendlingen (DE); Uwe Bolzhauser, Freiberg am Neckar (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 68 days.

(21) Appl. No.: 14/566,750

(22) Filed: Dec. 11, 2014

(65) Prior Publication Data

US 2015/0165365 A1 Jun. 18, 2015

(30) Foreign Application Priority Data

Dec. 13, 2013 (DE) .................. 10 2013 114 020

(51) Int. Cl.
*F02M 25/08* (2006.01)
*B01D 53/04* (2006.01)
*B01D 46/24* (2006.01)

(52) U.S. Cl.
CPC ....... *B01D 53/0407* (2013.01); *B01D 46/2418* (2013.01); *F02M 25/0854* (2013.01); *B01D 2253/102* (2013.01); *B01D 2253/3425* (2013.01); *B01D 2257/702* (2013.01); *B01D 2259/4516* (2013.01)

(58) Field of Classification Search
CPC .............. B01D 53/04; B01D 53/0407; B01D 2253/102; B01D 2253/3425; B01D 2257/702; B01D 2259/4516; B01D 46/2418; F02M 25/08; F02M 25/0854

USPC ......... 96/121, 131, 132, 134, 135, 139, 152; 95/146; 123/519

See application file for complete search history.

(56) References Cited

U.S. PATENT DOCUMENTS

| 6,928,990 B2 | 8/2005 | Meiller et al. | |
|---|---|---|---|
| 7,134,426 B2 | 11/2006 | Uchino et al. | |
| 2002/0124732 A1* | 9/2002 | Hara | B01D 53/0446 96/131 |
| 2006/0065251 A1* | 3/2006 | Meiller | F02M 25/0854 123/519 |
| 2008/0184973 A1* | 8/2008 | Yamazaki | B01D 53/0415 123/519 |
| 2011/0315126 A1* | 12/2011 | Yoshida | F02M 25/0854 123/519 |
| 2013/0284154 A1* | 10/2013 | Makino | F02M 25/0854 123/519 |

FOREIGN PATENT DOCUMENTS

| DE | 19807417 | 10/1998 |
|---|---|---|
| DE | 102007056667 | 5/2009 |
| DE | 2071172 | 6/2009 |

OTHER PUBLICATIONS

German Search Report dated Mar. 6, 2014.

* cited by examiner

*Primary Examiner* — Frank Lawrence
(74) *Attorney, Agent, or Firm* — Gerald E. Hespos; Michael J. Porco; Matthew T. Hespos

(57) ABSTRACT

A filter device for the exchange of gas between the fuel tank for liquid fuel and an environment has a chamber sealed in a fluid-tight manner. A first port leads into the chamber for fluid connection to the fuel tank. A second port into leads the chamber for fluid connection to the environment. A granular filter material is in the chamber. The chamber is designed for optionally accommodating a monolithic filter element in addition to the granular filter material.

14 Claims, 2 Drawing Sheets

FILTER DEVICE AND FILTER SYSTEM

CROSS REFERENCE TO RELATED APPLICATION

This application claims priority under 35 USC 119 to German Patent Appl. No. 10 2013 114 020.3 filed on Dec. 13, 2013, the entire disclosure of which is incorporated herein by reference.

BACKGROUND

1. Field of the Invention

The invention relates to a filter device and to a filter system for an exchange of gas between a fuel tank for liquid fuel and an environment.

2. Description of the Related Art

A fuel tank for liquid fuel in a motor vehicle is connected to an environment by a filter device. The tank customarily contains the liquid fuel and a volume of gas in which portions of the fuel are dissolved. Pressure in the fuel tank may rise due to heating, for example, because of solar insolation. Thus, the contents expand and the gas flows through the filter device and into the environment. The filter device is designed to retain at least a proportion of the fuel dissolved in the gas. For this purpose, a filter material for absorbing fuel is arranged in the filter device.

A tolerable concentration of fuel in the gas that escapes into the environment may vary when the filter device is used in different environments or in different motor vehicles. Regionally different limit values may also apply to the tolerable concentration.

U.S. Pat. No. 7,134,426 B2 discloses a filter device for treating fuel vapors. The filter device is filled partially with a granular filter material. A cartridge having a housing with further granular or monolithic filter material also can be used. The cartridge can be handled separately and can be exchanged at the filter device when the need arises.

U.S. Pat. No. 6,928,990 B2 discloses a further filter device for fuel vapors. This filter device has an encapsulated cartridge in which a filter material is arranged. The cartridge can be inserted into the filter device, and therefore fuel vapor from a tank flows through the cartridge.

The invention is based on the object of providing a filter device and a system that permit cost-effective and flexible filtering of fuel vapor.

SUMMARY OF THE INVENTION

The invention relates to a filter device for an exchange of gas between a fuel tank for liquid fuel and an environment. The filter device comprises a chamber sealed in a fluid-tight manner. A first port leads into the chamber for fluid connection to the fuel tank, and a second port leads into the chamber for fluid connection to the environment. A granular filter material is in the chamber. The chamber is designed for optionally, accommodating a monolithic filter element in addition to the granular filter material.

The optional monolithic filter element can be fit directly into the filter device during production. Separate handling of the filter element after completion of the filter device is not provided and is not required. As a result, costs can be saved during production of the filter device. A cartridge or another vessel for safe handling of the filter element can be dispensed with.

The monolithic filter element enables a filter device to be designed to readily match current regulations regarding filtering capacity. As a result, the filter device can be adapted in a modular manner to the requirements. If the requirements regarding the filtering capacity are low, the monolithic filter element may also be omitted. As a result, the filter device can be used, for example, in different motor vehicles and at different permissible limit values for a concentration of fuel in the gas escaping into the environment. The filtering capacity can be dimensioned during production of the filter device. The possibility of directly accommodating the monolithic filter element in the filter device enables a cross section through which the gas enters into and emerges from the monolithic filter element to be advantageously large. Thus, the flow rate of the gas within the filter element can be reduced. A filtering capacity of the filter element therefore can be used up to an improved extent.

The chamber can accommodate a filter element designed so that gas flows therethrough between opposite first and second ends in a manner so that a fluid flow between the first port and the second port runs through the filter element.

This configuration of the chamber makes it possible to avoid a portion of the gas flowing past the filter element. Thus, the filtering capacity of the filter element can be used to an improved extent. In addition, the accommodation of the filter element means that the filter element can be better protected against vibration and impact. Therefore, the position of the filter element within the chamber can remain unchanged even after a relatively long operating period, in particular in a motor vehicle.

The chamber may be divided into sections to accommodate the granular filter material in a first section and to accommodate the monolithic filter element in a second section. The filter material and the filter element thus can be secured better against slipping within the chamber. In addition, a penetration of granular filter material or fragments of the filter material into the monolithic filter element can be avoided. As a result, improved long term stability of the filter device can be provided.

A further division for forming a further section can be provided to accommodate a further monolithic filter element in the further section so that the filter elements are fluidically connected in series.

Different monolithic filter elements can be dimensioned independently of one another and the quality thereof can be selected. For example, the filter element that is closer to the second port, which is connected to the environment, can have a better filtering performance than the filter element that is farther away. The last-mentioned filter element can be designed to be more robust, more stable in the long term or more cost-effective. If only one filter element is provided in the two sections, the position of the filter element may be varied. This makes it possible to meet a secondary condition, such as center of gravity, temperature stability or a transition volume between the filter element and the environment to an improved extent.

The second and the further section may be designed to jointly accommodate a single-piece filter element as an alternative to the two separate filter elements. The single-piece filter element may be more cost-effective than the two separate filter elements. In addition, flow resistance during the transfer of the gas between the filter elements can be reduced.

The filter element may have the structure of a honeycomb. As a result, the filter element has two mutually opposite ends between which the gas can flow. A surface of the filter element along which the gas flows can be large with respect to the volume of the filter element. A controlled and efficient filtering by the filter element can thus take place.

The monolithic filter element may comprise activated carbon. Properties of the activated carbon of the filter element can be selected depending on the dimensions of the filter device and predetermined requirements imposed on the entire filtering capacity.

The granular filter material can comprise activated carbon. The choice of the size of the granules and of the material properties of the activated carbon used for the granular filter material can be selected freely. In particular, the materials of the monolithic filter elements and of the granular filter material can be selected in coordination with one another, but independently of one another.

A system according to the invention comprises the described filter device and at least one of the monolithic filter elements. A plurality of monolithic filter elements may be provided. The filter elements can be used in different arrangements on the filter device to provide a filter device adapted to predetermined requirements. The filter elements may also differ with regard to the dimensions thereof and the materials thereof.

The material of the monolithic filter element and the material of the granular filter material may have different filtering properties. In particular, the monolithic filter element may contain a material that provides better retention of fuel from the gas flowing through the filter material than the granular filter material. A large portion of the filtering capacity of the filter device can be provided by the granular filter material, and the filtering capacity of the monolithic filter element can be used in a modular manner for the specific improvement of the filtering capacity.

A filling element can be accommodated in the filter device instead of one of the monolithic filter elements. Stability for the filter device and protection of contained elements against vibration and impact can be provided cost-effectively by the filling element if a monolithic filter element is not required or is not desired.

The invention will now be described more precisely with regard to the attached figures.

DETAILED DESCRIPTION

Figure 1:
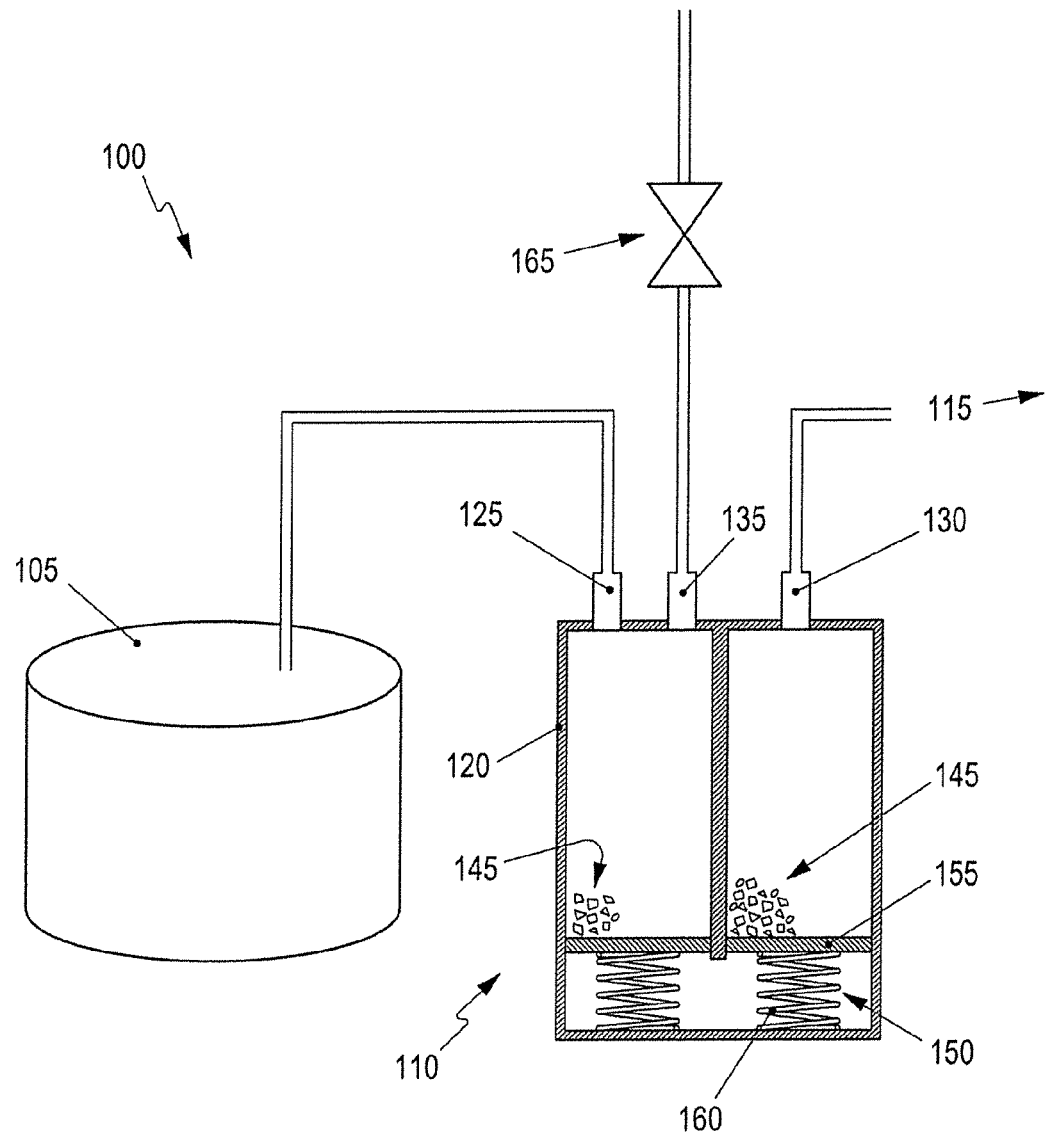
FIG. 1 is a schematic illustration of a fuel system with a filter device.

FIG. 1 is a schematic illustration of a fuel system 100 for use on board a motor vehicle. The fuel system 100 comprises a fuel tank 105 for liquid fuel and a filter device 110. The fuel tank 105 customarily is filled partially with the liquid fuel. A remaining residual volume is filled with a gas that customarily is formed by ambient air in which portions of the fuels are dissolved or are accumulated in the form of fuel vapor. The concentration of fuel in the gas is dependent on a vapor pressure of the fuel, which is dependent on a temperature of the fuel. If the temperature in the region of the fuel tank 105 rises, the gas and the fuel expand, thus producing a positive pressure. To dissipate the positive pressure, a portion of the gas is released through the filter device 110 into an environment 115.

The filter device 110 comprises a chamber 120, a first port 125 and a second port 130. The ports 125 and 130 lead into the chamber 120 which is otherwise closed in a fluid-tight manner. The first port 125 is connected fluidically to the fuel tank 105 by a tube, a hose or another connection. The connection leads into the fuel tank 105 preferably at a raised location to avoid liquid fuel from passing into the connection. The second port 130 can be connected to the environment 115 by a similar connection or can be connected directly to the environment 115.

In the illustrated embodiment, the chamber 120 is divided into two, but an undivided chamber 120 or a chamber divided multiple times is possible. The chamber 120 accommodates a granular filter material 145, of which only a small portion is shown in FIG. 1 for illustrative reasons. The granular filter material 145 can comprise activated carbon. One embodiment involves granules. In another embodiment, the material can also be pressed to form shaped coal; pellets ("compacts") also are referred to here. In yet another embodiment, granules may also be combined with compacts, for example by thorough mixing or lamination.

The quantity of the granular filter material 145 customarily is dimensioned in such a manner that the chamber 120 is filled loosely with the granular filter material 145. The chamber 120 customarily is designed so that a flow of gas between the first port 125 and the second port 130 through the chamber 120 covers as long a distance as possible through granular filter material 145. For this purpose, the illustrated two-part form of the chamber 120 can be used, or the first port 125 can be located opposite the second port 130 with respect to the granular filter material 145.

In the illustrated embodiment, an optional holding device 150 is provided to exert a predetermined compression force on the granular filter material 145. In the example illustrated, the holding device 150 comprises a covering 155 and an elastic element 160 for pressing the covering 155 onto the granular filter material 145. The covering 155 here preferably is perforated or is otherwise permeable to gas.

The chamber 120 preferably also comprises a third port 135 that is connected fluidically by a regeneration valve 165 to an intake tract of an internal combustion engine. If the regeneration valve 165 is opened, air flows from the environment 115 through the second port 130 into the chamber 120 and flows through the granular filter material 145 before leaving the chamber 120 through the third port 135 and being sucked into the internal combustion engine. As a result, the fuel retained in the granular filter material 145 can be removed again from the filter device 110 and recycled to the internal combustion engine. Opening and closing of the regeneration valve 165 preferably is controlled by a control device (not illustrated).

Figure 2:
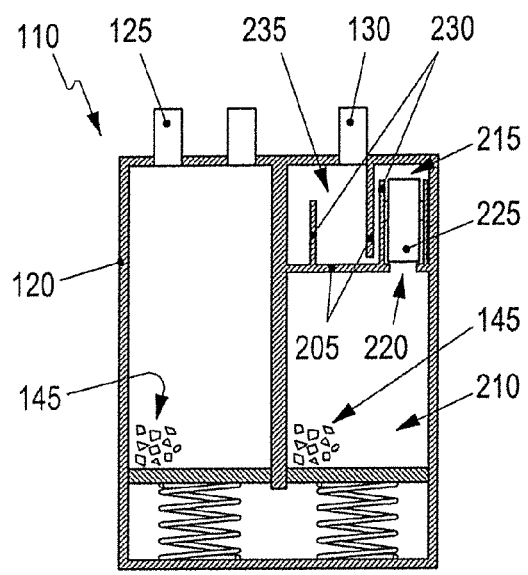
FIGS. 2-5 are schematic illustrations of alternate embodiments of the filter device.

FIG. 2 is a schematic illustration of a first alternate of the filter device 110 from FIG. 1. A division 205 is provided in the chamber 120 to divide the chamber 120 into a first section 210 and a second section 215. The division 205 comprises a cutout 220 through which the sections 210 and 215 are connected fluidically to each other. The second section 215 preferably lies closer to the second port 130 than the first section 210. The second section 215 is designed for accommodating an optional monolithic filter element 225. For this purpose, a holder 230 for fastening the filter element 225 can be provided. The filter element 225 can be fit in the chamber 120 or on the holder 230 directly and preferably without a tool.

The monolithic filter element 225 comprises one or more channels for the throughflow of gas. The filter element 225 may comprise activated carbon. The filter element preferably is shaped in the manner of a honeycomb that is elongated to a greater or lesser length. As a result, parallel channels are formed in the filter element 225 for the passage of gas. Ends of the channels lie opposite one another. The chamber 120 and the division 205 and/or the holder 230 are designed to accommodate the filter element 225 in the chamber 120 so that a fluid flow between the first port 125 and the second port 130 runs through the filter element 225 or through the channels thereof.

In one embodiment, the filter element 225 has a cylindrical shape, for example with a diameter of approx. 30 mm and a height of approx. 50 mm. A longitudinal axis of the filter element 225 preferably is aligned with a center line of the second port 130.

The monolithic filter element 225 is accommodated directly in the chamber 120. For this purpose, the filter element 225, like the granular filter material 145, is arranged in the chamber 120 before the chamber 120 is closed during the production of the filter device 110. Maintenance or an exchange of the filter element 225 after the first commissioning of the filter device 110 is not provided.

In the embodiment illustrated in FIG. 2, a second division 205 is provided in order to form a third section 235 within the chamber 120. The sections 210, 215 and 235 are fluidically connected in series. The third section 235 is likewise provided for accommodating a monolithic filter element 225. For this purpose, a further holder 230 can be provided. However, in the embodiment illustrated, a filter element 225 is not arranged in the third section 235, but rather the third section 235 remains empty. Depending on how high a filtering capacity of the filter device 110 is intended to be, a filter element 225 can be arranged in each case either in the section 215 or in the third section 235 or in the two sections 215, 235.

The filter elements 225 used may differ with regard to the dimensions thereof, the structure thereof or the material thereof. In a particularly preferred embodiment, the sections 215, 235, differently than illustrated in FIG. 2, lie axially one behind another and are aligned with a center line of the second port 130. In order to accommodate a filter element 225, the third section 235 can be provided with the same dimensions as those of the second section 215; in a preferred exemplary embodiment, cylindrically with a diameter of approx. 30 mm and a height of approx. 50 mm. A longitudinal axis of the filter element 225 is preferably aligned here with a center line of the second port 130 or with the longitudinal axis of another filter element 225.

The available space for accommodating granular filter material 145 is reduced in comparison to the embodiment illustrated in FIG. 1 because of the formation of the sections 215 and 235. To compensate for the associated, reduced efficiency of the filter device 110, the inserted granular filter material 145 can have improved material properties, and therefore the filtering capacity corresponds to that of the filter device 110 from FIG. 1, even without an inserted filter element 225.

Figure 3:
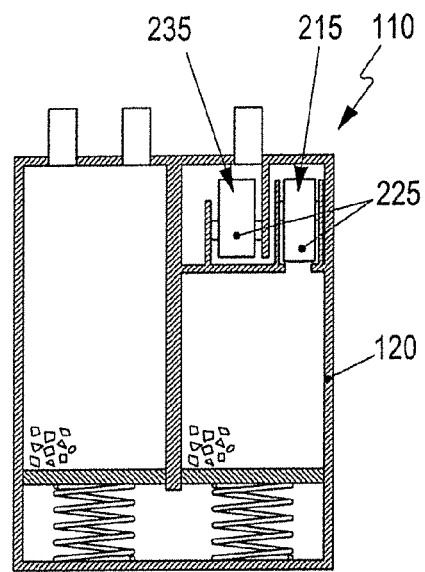

FIG. 3 is a schematic illustration of a further embodiment of the filter device 110. In the sections 215 and 235, a monolithic filter element 225 is in each case directly accommodated in the chamber 120. The filter elements 225 can have dimensions differing from one another.

Figure 4:
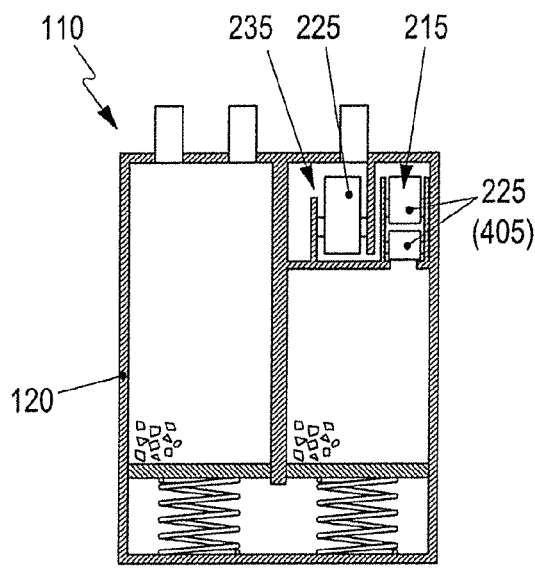

FIG. 4 is a schematic illustration of a further embodiment of the filter device 110. In contrast to the embodiment illustrated in FIG. 3, two separate monolithic filter elements 225 are arranged in the second section 215. The filter elements 225 can differ from or correspond to one another with regard to the dimensions thereof, the material thereof and in particular with regard to the filtering properties thereof. In a further embodiment, one of the filter elements 225 is replaced by a filling element 405 that is permeable to fluid. The filling element 405 can contribute toward improving the stability of an adjacent filter element 225 in the arrangement thereof in the chamber 120. The filling element 405 customarily does not have a filter function, and therefore the filling element preferably is used only when required for weight, manufacturing or stability reasons.

Figure 5:
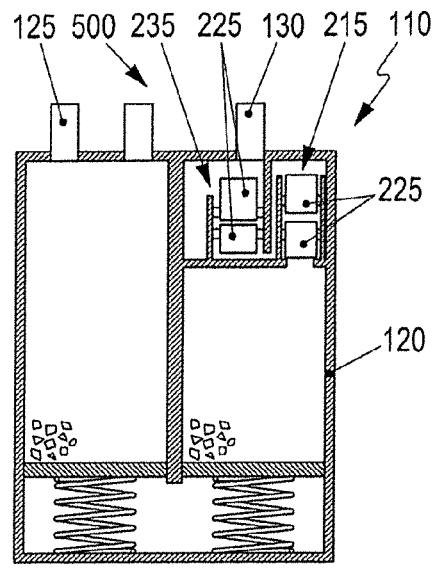

FIG. 5 is a schematic illustration of a further embodiment of the filter device 110. In contrast to the embodiment illustrated in FIG. 4, two monolithic filter elements 225 are provided in the second section 215, and also in the third section 235. Of course, one or both of the filter elements 225 illustrated can also be replaced by a filling element 405. Alternatively, a filter element 225 that is not required can be omitted and the associated space in one of the sections 215, 235 remains empty.

The filter device 110 can be adapted in a modular manner to predetermined filtering properties. For this purpose, a monolithic filter element 225 can be provided, or not provided, in the second section 215, which is formed by the division 205, and, if provided, in the third section 235 and/or in further sections formed in a corresponding manner. Individual filter elements 225 can also be replaced by a plurality of filter elements 225. Each filter element 225 can also be replaced by a filling element 405.

A system 500 comprises the chamber 120 with the ports 125 and 130, wherein the chamber 120 comprises at least one division 205, and therefore the chamber 120 comprises a first section 210 and a second section 215. Furthermore, the system 500 comprises at least one monolithic filter element 225 that can be used in the second section 215. The system 500 preferably comprises a plurality of filter elements 225 that differ with regard to the dimensions or filtering properties thereof. Furthermore, the system 500 can comprise one or more filling elements 405, wherein each filling element 405 has external dimensions that correspond to one of the filter elements 225 that can be installed.

What is claimed is:
1. A filter device for an exchange of gas between a fuel tank for liquid fuel and an environment, the filter device comprising:
 a chamber sealed in a fluid-tight manner, the chamber being divided into a first section, a second section connected in series downstream of the first section, a third section connected in series downstream of the second section and a fourth section connected in series downstream of the third section;
 a first port leading into the first section of the chamber and providing fluid connection to the fuel tank;
 a second port leading into the fourth section of the chamber and providing a fluid connection to the environment;
 a third port leading from the first section of the chamber and providing fluid connection to an internal combustion engine;
 a granular filter material in the first and second sections of the chamber; and
 the third and fourth sections of the chamber being configured for optionally accommodating at least one monolithic filter element, and the at least one monolithic filter element being provided in at least one of the third and fourth sections of the chamber in addition to the granular filter material in the first and second sections of the chamber to achieve a specified filtering capacity.
2. The filter device of claim 1, wherein the chamber is configured so that a fluid flow between the first port and the second port runs through the at least one monolithic filter element.

3. The filter device of claim 1, wherein the chamber comprises divisions dividing the chamber into the first and second sections to accommodate the granular filter material in the third and fourth sections and to accommodate the monolithic filter element in a second section.

4. The filter device of claim 1, wherein the filter element has a structure of a honeycomb.

5. The filter device of claim 1, wherein the monolithic filter element comprises activated carbon.

6. The filter device of claim 1, wherein the granular filter material comprises activated carbon.

7. A system comprising the filter device of claim 1 and at least one of the monolithic filter elements.

8. The system of claim 7, wherein the material of the monolithic filter element and the material of the granular filter material have different filtering properties.

9. The system of claim 8, further comprising a filling element for accommodating the filter device instead of one of the monolithic filter elements.

10. The filter device of claim 1, wherein the first section and the second section of the chamber are configured and disposed to require a reversal of a flow direction between the first section and the second section, and wherein the third section and the fourth section of the chamber are configured and disposed to require a reversal of a flow direction between the third section and the fourth section.

11. The filter device of claim 1, further comprising a non-filtering filling element in at least one of the third and fourth sections of the chamber to achieve a specified weight distribution for the chamber.

12. The filter device of claim 1, wherein the third and fourth sections of the chamber have substantially identical cross-sections.

13. The filter device of claim 1, wherein the third and fourth sections of the chamber have different cross-sections.

14. The filter device of claim 1, wherein the monolithic filter element has a greater filtering capacity than the granular filter material.

* * * * *